March 12, 1946. H. L. BLUM 2,396,410
MECHANICAL MOVEMENT
Filed Feb. 10, 1943

Hosmer L. Blum
INVENTOR.
BY Edmund W. E. Kamm
ATTORNEY

Patented Mar. 12, 1946

2,396,410

UNITED STATES PATENT OFFICE 2,396,410

MECHANICAL MOVEMENT

Hosmer L. Blum, Fort Wayne, Ind.

Application February 10, 1943, Serial No. 475,445

9 Claims. (Cl. 74—60)

This invention relates to a mechanical movement which is adapted to transform reciprocating movement into rotary movement. More specifically, it relates to a piston driven, nutatory member which drives a crank.

One object of the invention is to provide a structure which is adapted to reduce friction losses to a minimum.

Another object of the invention is to provide means for adjustably controlling the stroke of the pistons.

Yet another object of the invention is to provide a mechanism of the type described in which the stroke of the pistons is controlled by the driven member.

It is still another object of the invention to provide a mechanism of the type described in which the stroke of the piston is controlled by the adjustment of the piston control member with respect to the driven member.

These and other objects will become apparent from a study of this specification in connection with the drawing which is attached hereto and which forms a part hereof, and in which.

Figures 1, 2:
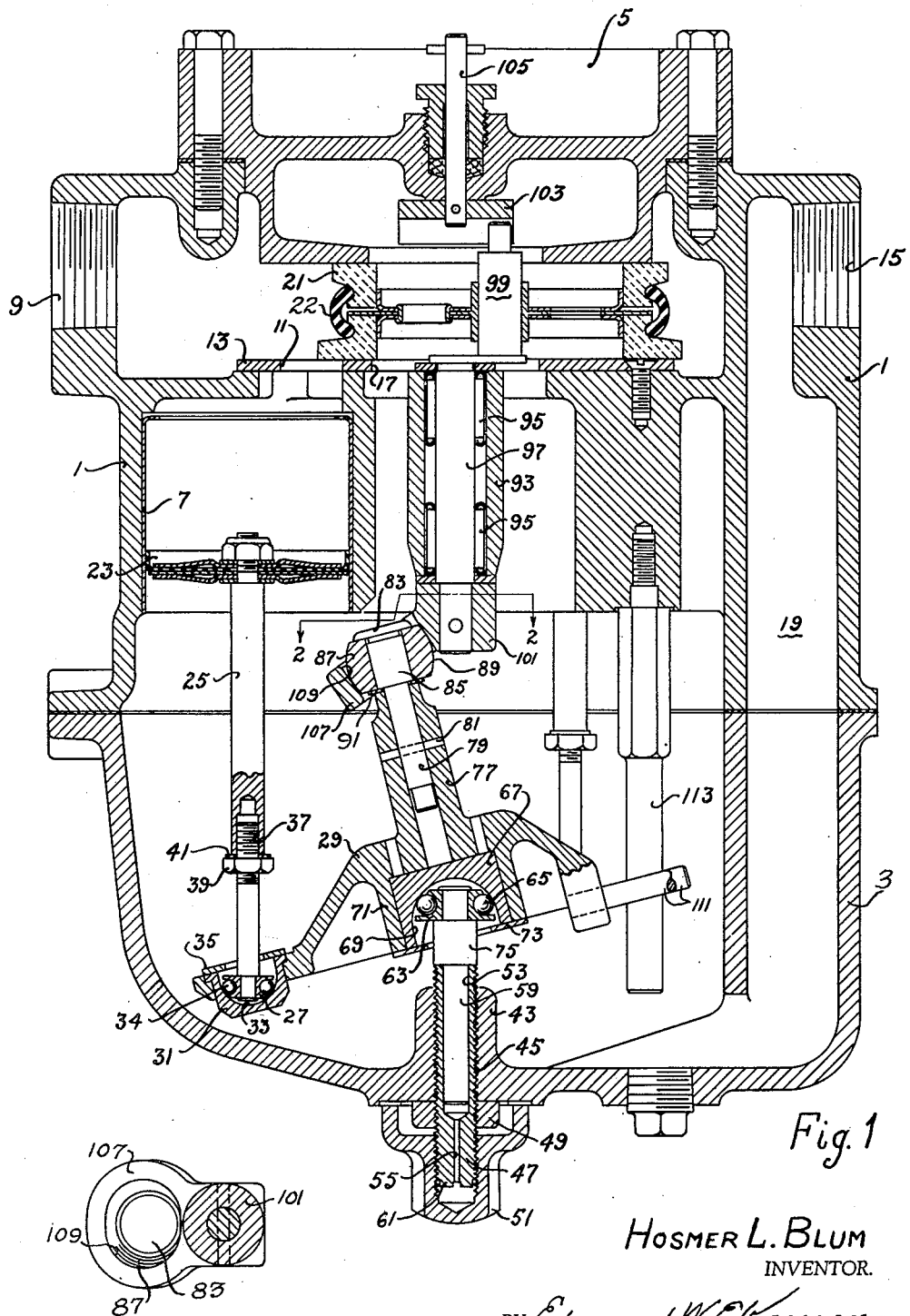
Figure 1 is a vertical, sectional view of the invention applied to a liquid meter.
Figure 2 is a sectional view taken on the line 2—2 of Figure 1 showing the bearing for the driven member.

Referring to Figure 1, in which the invention is shown applied to a meter, numeral 1 represents a casing which has connected to it, by means of suitable fastenings, a bowl 3 and a cover 5.

The casing is provided with cylinders 7 which are connected, either to the inlet 9 through ports 11 in port plate 13 or to the outlet 15 through the ports and the openings 17 and 19. The ports are controlled by a carbon valve 21. A rubber band 22 is adapted to encompass the valve 21 so as to provide a liquid seal.

Pistons 23, three or more in number, are adapted to operate in the cylinders 7. Each piston has a rod 25 which carries at its lower end a grooved ball race 27. A control member 29 has fixed in it a bearing insert 31 which has a spherical recess 33 for the reception of the ball bearings 34 and race 27. A retainer 35 is fixed in any suitable manner to the bearing insert and serves to prevent the race from being withdrawn from the bearing, and thus preventing escape of the balls.

The piston rod is in two pieces which are adjustably screwed together at 37 and locked in adjusted position by a nut 39 which bears on a lock washer 41.

A vertical boss 43 is provided in the lower part of the bowl and the boss has a threaded bore 45 which is adapted to receive an adjusting screw 47. A lock nut 49 is mounted on the screw and is adapted to engage the meter bowl to hold the adjusting screw in adjusted position. A seal cap 51 is adapted to be mounted on the lower end of the screw.

The screw 47 is provided with a large bore 53 at its upper end which merges with a small vent bore 55. A pilot bearing 59 is mounted in the bore 53 while a screw 61 seals the lower end of the bore 55. This structure permits ready assembly of the meter. The piston control member and central bearing are fitted to the parts in the casing, and the bowl, with the adjusting screw, is thereafter placed in position.

The upper end of the pilot carries a ball race 63 adapted to receive balls 65.

A bearing 67 having a spherical recess 69 for the reception of the balls and ball race is fixed in the boss 71 formed on the control member 29. A retainer 73 is fixed to the bearing 67 to hold the balls and ball race against excessive displacement. The piston carries a collar 75 which abuts against the top of the adjusting screw to limit the depth to which the pilot enters the bore 53, and at the upper end abuts the ball race to properly position it.

A second hollow boss 77, which is in axial alignment with the boss 71, receives a journal shaft 79 which is fixed in place by pin 81. The upper end of shaft 79 is provided with a head 83 and, below the head, with a journal 85. A roll 87, having a spherical surface 89, is mounted on the journal between the head 83 and a washer 91 which is supported on the shaft and abuts the upper end of the boss 77.

A hollow boss 93 is fixed in the case 1 and supports, by means of needle bearings 95, a crank shaft 97 which has a crank 99 at its upper end crank 99 at its upper end and a crank 101 at its lower end.

The upper crank 99 carries the valve 21 and also drives a yoke 103 which drives a shaft 105 which is the power output shaft.

The lower crank 101 comprises an arm 107 which extends downwardly at an angle to the axis of the shaft and which is provided with an opening 109. The axis of the crank shaft and that of the opening lie in the same plane and intersect, preferably at an angle of 45 degrees, although this angle may vary, depending upon the amount of axial adjustment of the pistons to be effected for a given axial adjustment of the adjusting screw 47.

The crank shaft 97, adjusting screw 45 and piston 59 are coaxial, while the axis of journal shaft 79 lies in the same plane and intersects this axis.

The control member 29 carries a pair of projections 111 which constitute a fork which is adapted to engage opposite sides of a pin 113 which is fixed in the case 1. The pin and fork prevent rotation of the control member about the adjusting bearing 69 and thus prevent undue tilting of the pistons in the cylinders.

Operation

Fluid entering the passage 9 passes into the cylinders and forces the pistons downwardly in regular order under control of the valve. The thrust of each piston tilts the control member and produces a nutatory action thereof which is well known in various arts, and the control member drives the crank 101 and its associated parts.

By adjusting the screw 45, pilot bearing 59 and the control member 29 up or down, the angle of intersection of the axes of journal shaft 79 and of the crank shaft 97 is changed, because the roller 89 is moved toward or away from the crank shaft 97 so that the effective radius of crank 101 is decreased or increased correspondingly. As the pilot bearing 59 moves up, the stroke of the pistons 23 is increased, whereas if the pilot bearing moves down, the stroke of the pistons is decreased.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a mechanical movement, the combination of a plurality of pistons, a bearing, means mounting said bearing for axial movement a control member mounted on said bearing, for movement therewith, piston rods connecting said member to be nutated about said bearing by said pistons, a driven shaft, and means connecting said control member to drive said shaft, said connecting means and control member cooperating to limit the stroke of said pistons and being relatively movable to permit said axial movement of said bearing.

2. In a mechanical movement, the combination of a plurality of pistons, a bearing, means mounting said bearing for axial movement a control member mounted on said bearing, for movement therewith, piston rods connecting said member to be nutated about said bearing by said pistons, a driven shaft, means connecting said control member to drive said shaft, said connecting means and control member being constructed and arranged to limit the stroke of said pistons and being relatively movable to permit said axial movement of said bearing, and means for adjusting said bearing axially relative to said connecting means, said last named means, said connecting means and said control member cooperating to adjust the stroke of said pistons.

3. In a mechanical movement, the combination of a plurality of pistons, a bearing, a control member mounted on said bearing and connected to be nutated thereabout by said pistons, a driven shaft, means connecting said control member to drive said shaft, said connecting means and control member being constructed and arranged to limit the stroke of said pistons, said bearing comprising a downwardly open, spherical surface, a ball race disposed below said surface, and ball bearings in said race and disposed in contact with said surface.

4. In a mechanical movement, the combination of a plurality of pistons, a support bearing, a control member mounted on said bearing and connected to be nutated thereabout by said pistons, a shaft, a crank connected to said shaft, and an axial projection formed on said member and connected to drive said crank, said connection being constructed and arranged to confine said projection against substantial movement toward or away from said crank to limit the stroke of said pistons.

5. In a mechanical movement, the combination of a plurality of pistons, a support bearing, a control member mounted on said bearing and connected to be nutated thereabout by said pistons, a shaft, a crank connected to said shaft, an axial projection formed on said member and connected to drive said crank, said connection being constructed and arranged to confine said projection against substantial movement toward or away from said crank to limit the stroke of said pistons, and means including said support bearing for adjusting said projection substantially axially with respect to said crank to vary the effective radius of said crank so as to vary the stroke of said pistons.

6. In a mechanical movement, the combination of a plurality of pistons, a support bearing, a control member mounted on said bearing and connected to be nutated thereabout by said pistons, a shaft, a crank connected to said shaft, an axial projection formed on said member, a bearing mounted on said projection, a cylindrical opening in said crank defined by a bearing surface which is inclined to the axis of said shaft and which is adapted to contact said last named bearing, and means including said support bearing for relatively adjusting said last named bearing and bearing surface to increase or decrease the effective radius of said crank whereby the stroke of the pistons will be changed.

7. In a mechanical movement, the combination of a plurality of pistons, an axially movable support bearing, a control member mounted on said bearing and connected to be nutated thereabout by said pistons, a shaft, a crank connected to said shaft, an axial projection formed on said member, a bearing mounted on said projection, a substantially cylindrical opening in said crank defined by a bearing surface which is inclined to the axis of said shaft and which is adapted to have substantially line contact with said last named bearing, and means including said support bearing, for relatively adjusting said last named bearing and bearing surface to increase or decrease the effective radius of said crank whereby the stroke of the pistons will be changed.

8. In a mechanical movement, the combination of a plurality of pistons, an axially movable support bearing, a control member mounted on said bearing and connected to be nutated thereabout by said pistons, a shaft, a crank connected to said shaft, an axial projection formed on said member, a substantially spherical bearing mounted on said projection, an opening in said crank defined by a cylindrical bearing surface the longitudinal axis of which is inclined to the axis of said shaft and which is adapted to contact said last named bearing, and means including said support bearing for relatively adjusting said last named bearing and bearing surface to increase or decrease the effective radius of said crank whereby the stroke of the pistons will be changed.

9. In a mechanical movement, the combination of a plurality of pistons, a support bearing, a control member mounted on said bearing and connected to be nutated thereabout by said pistons, a shaft, a crank connected to said shaft, an axial projection formed on said member, a bearing mounted on said projection, an opening in said crank defined by a bearing surface having its central axis which is inclined to the axis of said shaft and which is adapted to contact and hold said last named bearing against substantial movement toward or away from said shaft, and means for relatively adjusting said last named bearing and bearing surface to increase or decrease the effective radius of said crank whereby the stroke of the pistons will be changed, said adjusting means comprising an adjustable support for said support bearing.

HOSMER L. BLUM.